United States Patent

Hebbale et al.

[11] Patent Number: 5,984,825
[45] Date of Patent: Nov. 16, 1999

[54] POWER TRANSMISSION WITH TWO SIMPLE PLANETARY GEARSETS

[75] Inventors: Kumaraswamy V. Hebbale; Sekhar Raghavan; Patrick Benedict Usoro, all of Troy, Mich.

[73] Assignee: General Motors Corporation, Detroit, Mich.

[21] Appl. No.: 09/144,140

[22] Filed: Aug. 31, 1998

Related U.S. Application Data

[63] Continuation-in-part of application No. 09/037,332, Mar. 10, 1998.

[51] Int. Cl.$^6$ ....................................................... F16H 3/44
[52] U.S. Cl. ............................ 475/286; 475/271; 475/284
[58] Field of Search ................................... 475/269, 271, 475/280, 284, 286, 290

[56] References Cited

U.S. PATENT DOCUMENTS

| | | |
|---|---|---|
| 5,194,055 | 3/1993 | Oshidari .................. 475/281 |
| 5,383,822 | 1/1995 | Pierce ..................... 475/281 |
| 5,577,976 | 11/1996 | Haka ...................... 475/280 |
| 5,692,988 | 12/1997 | Beim et al. . |
| 5,833,568 | 11/1998 | Park ....................... 475/284 |
| 5,836,850 | 11/1998 | Raghavan et al. ......... 475/286 |
| 5,879,264 | 3/1999 | Raghavan et al. ......... 475/280 |

*Primary Examiner*—Dirk Wright
*Assistant Examiner*—Peter T. Kwon
*Attorney, Agent, or Firm*—George A. Grove

[57] ABSTRACT

A planetary gear arrangement has two simple planetary gearsets and six selectively engageable friction torque transmitting mechanisms which are controlled to establish five forward transmission ratios and one reverse transmission ratio. One of the planetary gearsets establishes one forward ratio and the reverse ratio. The two planetary gearsets are compounded through both a continuous torque transmitting connection and a selectively engageable drive connection comprised of one of the torque transmitting mechanism during the two lowest forward transmission ratios and through the continuous torque transmitting connection during the highest of the forward transmission ratios. Both planetary gearsets are maintained in a direct drive ratio during the numerically central (third) forward ratio.

2 Claims, 1 Drawing Sheet

POWER TRANSMISSION WITH TWO SIMPLE PLANETARY GEARSETS

This invention is a Continuation-in-Part application of U.S. Ser. No. 09/037,332, filed Mar. 10, 1998.

TECHNICAL FIELD

This invention relates to multi-speed power transmissions having two simple planetary gearsets.

BACKGROUND OF THE INVENTION

Current passenger vehicles have an internal combustion engine which provides output speed and torque over a range of speeds. However, this speed range is not sufficient, nor is the torque range sufficient, to provide good operating characteristics for a vehicle.

To assist the engine in providing adequate operating ranges for the vehicles, a multi-speed power transmission is combined with the engine to form a powertrain for the vehicle. The transmission generally consists of a plurality of gear ratios which may either be manually or hydraulically selected. A vast majority of the current vehicles utilize automatic shifting power transmissions in which an electro-hydraulic control system is utilized to effect the establishment of each individual ratio and to control the interchange between ratios.

The automatic shifting power transmissions generally include two or more planetary gear arrangements which may be coupled in a variety of manner. Generally, with two planetary gearsets being utilized, a four-speed forward planetary gear arrangement or powertrain is provided. Thus, it is obvious that the engine operating range is utilized in each of the four transmission ranges to provide a wide vehicle operating range. The transmission also includes a reverse drive ratio.

Many current vehicles also utilize a five-speed power transmission, however, the current vehicles utilizing five-speed transmissions incorporate interconnected planetary transmissions to provide the five forward speeds and one reverse speed.

SUMMARY OF THE INVENTION

It is an object of the present invention to provide an improved power transmission having two simple planetary gearsets controlled by friction devices to provide five forward transmission ratios and one reverse transmission ratio.

In one aspect of this invention, both of the planetary gearsets are simple planetary gearsets having a single pinion carrier assembly. The planetary gearsets are combined such that a continuous input drive is provided to one planetary set and a continuous drive connection is provided between members of the two sets.

In another aspect of this invention, two input clutches and three brakes are provided to control the rotation of a portion of the planetary members and a third selectively engageable clutch is operated to interconnect members of the two planetary gearsets.

In still a further aspect of this invention, a single pinion planetary gearset is utilized to provide both the reverse drive ratio and the second highest or fourth of the forward transmission ratios.

BRIEF DESCRIPTION OF THE DRAWINGS

The drawing is a schematic representation of a powertrain incorporating the present invention, wherein both planetary gearsets are single pinion simple planetary gearsets.

DESCRIPTION OF EXEMPLARY EMBODIMENTS

Figure 1:
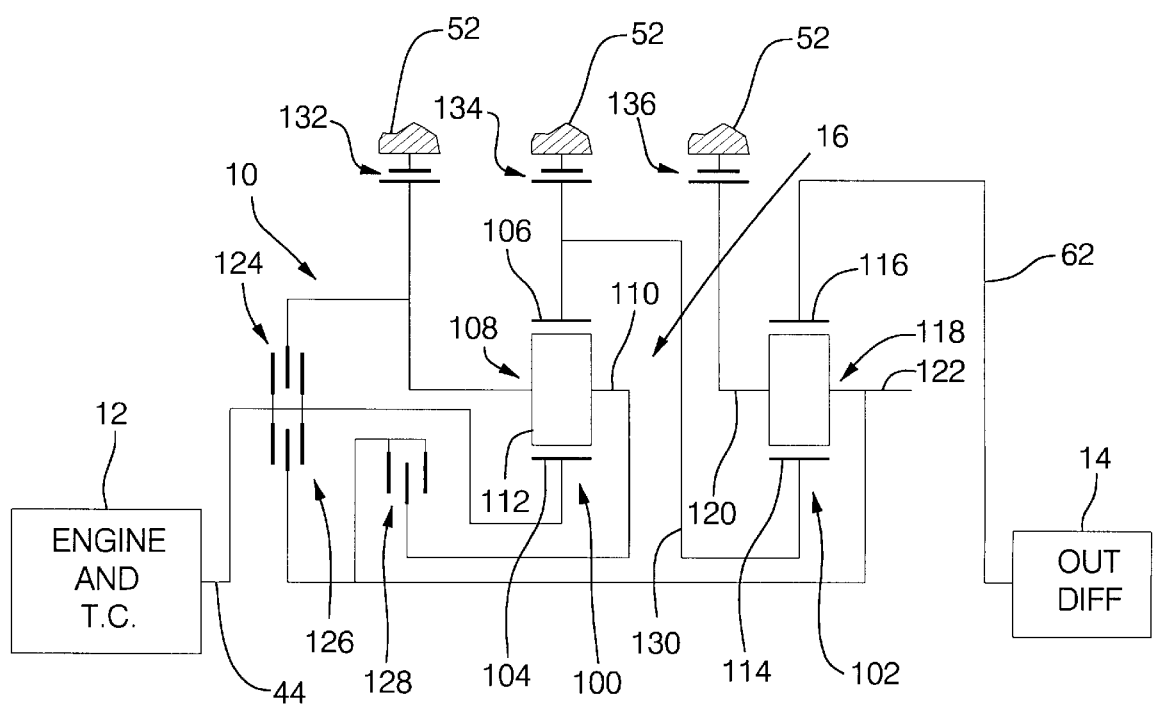

A powertrain 10 includes an engine and torque converter 12, a differential 14 and a planetary gear arrangement 16. The planetary gear arrangement 16 has a first planetary gearset 100 and a second planetary gearset 102. The planetary gearset 100 has a sun gear 104, a ring gear 106 and a planet carrier assembly 108. The planet carrier assembly 108 has a cage or spider 110 on which is rotatably mounted a plurality of single pinions 112.

The planetary gearset 102 has a sun gear 114, a ring gear 116 and a planet carrier assembly 118. The planetary carrier assembly 118 includes a planet cage 120 on which is rotatably mounted a plurality of single pinions 122 meshing with the sun gear 114 and the ring gear 116. The ring gear 116 is connected through an output hub and shaft 62 to the differential 14.

The engine and torque converter 12 is drivingly connected with a transmission input shaft 44 which is continuously driven with the sun gear 104 and is selectively drivingly connected with a fluid clutch 124 and second fluid clutch 126. The clutch 124 is connected with the planet carrier assembly 108 and the clutch 126 is connected with the planet carrier assembly 118. Carrier assembly 108 is connectible with the carrier assembly 118 through a selectively engageable friction clutch 128. The sun gear 114 and ring gear 106 are continuously drivingly interconnected through a torque transmitting member 130.

The planetary carrier assembly 108 is selectively held stationary by a selectively engageable friction brake 132 connected with the transmission housing 52. The ring gear 106 and sun gear 114 are selectively held stationary through a selectively engageable friction brake 134 and the carrier assembly 118 is selectively held stationary by a selectively engageable friction brake 136.

The clutches 124, 126 and 128 and the brakes 132, 134 and 136 are conventional selectively engageable friction devices which are well known in the art. The engagement and disengagement of these devices can be controlled through a conventional hydraulic control system, not shown, which might include electronic controls to control the actuation of various devices within the transmission system. These types of controls are well known in the transmission art.

The brakes utilized with planetary gearsets 16 are depicted schematically as band type brakes, however, it is well known to utilize a disc type friction brake in place of a band brake in the transmission art.

The planetary gear arrangement 16 will provide five forward speed ratios and one reverse transmission ratio. The first forward speed ratio is provided with the actuation of clutch 128 and brake 136. This establishes the planet carrier assemblies 108 and 118 as reaction members, such that the input drive to the sun gear 104 which is continuously driven by the input shaft 44 is reversed through the ring gear 106 and then again, the sun gear 114 to ring gear 116 reverses the output back to a forward direction resulting in a reduced forward drive ratio at the differential 114.

The second forward drive ratio is established by disengaging the brake 136 and engaging the brake 134 which establishes the ring gear 106 as a reaction member in the planetary gearset as well as the sun gear 114. Thus, a reduced speed at the carrier assembly 108 is directed to the carrier assembly 118 which results in a reduced forward transmission ratio at the differential assembly 14.

The third forward drive ratio is established by disengaging the brake 134 while engaging the clutch 126. The engagement of clutches 126 and 128 results in a direct drive ratio through the planetary gear arrangement 16.

The fourth forward drive ratio is established by releasing the clutch 128, engaging the brake 134 and maintaining the clutch 126 engaged, this results in the planetary gearset 102 providing an overdrive ratio between the input shaft 44 and the output hub 62.

The fifth and highest forward transmission ratio is provided by engaging the brake 132 while disengaging the brake 134. This establishes the planet carrier assembly 108 as a reaction member, such that the ring gear 106 is driven in a direction opposite to the input shaft 44 which results in reverse rotation of the sun gear 114 and therefore an increased overdrive ratio of the ring gear 116.

The planetary gear arrangement 16 provides a reverse drive ratio through the actuation of brake 136 and clutch 124. With the clutch 124 engaged, the entire planetary gearset 100 operates at a direct drive ratio resulting in the sun gear 114 being driven forwardly at the speed of the input shaft 44 and a reverse ratio being directed from the ring gear 116 to the output differential 14 since the planet carrier assembly 118 is held stationary.

Thus, the powertrain 10 provides both the reverse ratio and the fourth highest forward ratio through the second planetary gearset 102.

With the planetary gear arrangement 16 if the planetary gearset 100 is given a ring to sun ratio of 1.5, and the planetary gearset 102 is given a ring to sun ratio of 1.82, the following gear ratios can be expected.

| | |
|---|---|
| First Gear | 2.73:1 |
| Second Gear | 1.61:1 |
| Third Gear | 1:1 |
| Fourth Gear | .65:1 |
| Fifth Gear | .52:1 |
| Reverse Gear | 1.82:1 |

By changing the ring to sun ratio of planetary gearset 100, the first, second and fifth ratios will be changed. If the ring to sun ratio of planetary gearset 100 is increased, each of these ratios will increase. If the ring to sun ratio of planetary gearset 102 is increased, all of the ratios will be increased.

In view of the above description, it should be appreciated that the planetary gear arrangement 16 will provide five forward speed ratios and one reverse speed ratio between the transmission input shaft and the transmission output with two simple planetary gearsets.

We claim:

1. A power transmission comprising;
   input torque means;
   output torque means;
   first and second simple planetary gear sets each comprising three members;
      a first member of said first planetary gear set being continuously drivingly connected with said input torque means, a second member of said first planetary gear set being continuously drivingly connected through a torque transmitting member with a first member of said second planetary gear set, a third member of said first planetary gear set being selectively connected with a second member of said second planetary gear set by a first selectively engageable clutch;
      a third member of said second planetary gear set being continuously drivingly connected with said output torque means;
      second and third selectively engageable clutches for respectively selectively connecting said third member of said first planetary gear set and said second member of said second planetary gear set with said input means;
   first, second and third selectively engageable brakes for selectively restraining rotation of said second member of said second planetary gear set, said second member of said first planetary gear set and said third member of said first planetary gear set; and
   said clutches and brakes being selectively engaged in pairs to provide five forward transmission ratios and one reverse transmission ratio with said second planetary gear set being effective to provide said reverse ratio and one of said forward ratios, and a lowest of the forward ratios and a highest of the forward ratios having at least a portion of torque transmitted through said torque transmitting member drive connecting said second member of said first planetary gear set and said first member of said second planetary gear set.

2. A power transmission comprising:
   a transmission torque input member;
   a transmission torque output member;
   a first planetary gear assembly having a plurality of members comprising, a ring member, a sun gear member continuously drivingly connected with said transmission torque input member, and a planet carrier assembly member;
   a second planetary gear assembly having a plurality of members comprising, a ring gear member continuously drivingly connected with said transmission torque output member, a sun gear member, and a planet carrier assembly member;
   a torque transmitting member continuously connecting said ring gear member of the first planetary gear assembly with the sun gear member of the second planetary gear assembly;
   a first selectively engageable torque transmitting mechanism for selectively interconnecting said planet carrier assembly member of the first planetary gear assembly with said planet carrier assembly member of the second planetary gear assembly;
   a second selectively engageable torque transmitting mechanism for selectively restraining rotation of said planet carrier assembly member of said second planetary gear assembly;
   a third selectively engageable torque transmitting mechanism for selectively restraining rotation of said sun gear member of said second planetary gear assembly and said ring gear member of said first planetary gear assembly;
   a fourth selectively engageable torque transmitting mechanism for selectively restraining rotation of said planet carrier assembly member of said first planetary gear assembly;
   a fifth selectively engageable torque transmitting mechanism for selectively drivingly connecting said transmission input member with said planet carrier assembly of said second planetary gear assembly; and
   a sixth selectively engageable torque transmitting mechanism for selectively connecting said planet carrier assembly member of said first planetary gear assembly with said transmission input member, said selectively engageable torque transmitting mechanisms being selectively engageable in combinations of two to establish five forward transmission ratios and one reverse transmission ratio between said transmission torque input member and said transmission torque output member.

* * * * *